United States Patent
Sung et al.

(10) Patent No.: US 10,079,947 B1
(45) Date of Patent: Sep. 18, 2018

(54) IMAGE ALIGNMENT ADJUSTMENT MECHANISM OF SCANNER AND ADJUSTMENT TOOL FOR THE SAME

(71) Applicant: KINPO ELECTRONICS, INC., New Taipei (TW)

(72) Inventors: Hung-Huan Sung, New Taipei (TW); Yu-Ming Hsu, New Taipei (TW); Hui-Min Chen, New Taipei (TW)

(73) Assignee: KINPO ELECTRONICS, INC., New Taipei (TW)

( * ) Notice: Subject to any disclaimer, the term of this patent is extended or adjusted under 35 U.S.C. 154(b) by 0 days.

(21) Appl. No.: 15/638,108

(22) Filed: Jun. 29, 2017

(30) Foreign Application Priority Data

May 17, 2017 (TW) .............................. 106116288 A

(51) Int. Cl.
*H04N 1/04* (2006.01)
*H04N 1/00* (2006.01)

(52) U.S. Cl.
CPC ....... *H04N 1/0066* (2013.01); *H04N 1/00015* (2013.01); *H04N 1/00135* (2013.01); *H04N 1/00702* (2013.01); *H04N 1/00774* (2013.01); *H04N 2201/02439* (2013.01)

(58) Field of Classification Search
CPC . B41J 29/13; B41J 2/1752; B41J 29/02; B41J 29/38; B41J 2/175; B41J 2/17509; B41J 2/17596; H04N 1/00557; H04N 1/0083; H04N 1/1017; H04N 1/193; B29C 47/06; B29C 67/0088; B29C 67/0092; B33Y 30/00; B33Y 50/02; B66F 17/00; B66F 9/063; B66F 9/065; B66F 9/07559

USPC ......................................... 358/474, 497, 496
See application file for complete search history.

(56) References Cited

U.S. PATENT DOCUMENTS

| 6,115,147 A * | 9/2000 | Mizumoto | H04N 1/192 358/483 |
| 7,593,149 B2 * | 9/2009 | Tomita | H04N 1/032 347/263 |
| 2006/0209361 A1 * | 9/2006 | Sato | H04N 1/028 358/474 |
| 2007/0064287 A1 * | 3/2007 | Mai | G02B 27/024 358/504 |
| 2007/0159665 A1 * | 7/2007 | Kim | H04N 1/03 358/474 |

(Continued)

*Primary Examiner* — Negussie Worku
(74) *Attorney, Agent, or Firm* — Chun-Ming Shih; HDLS IPR Services

(57) ABSTRACT

An image alignment adjustment mechanism of a scanner and an adjustment tool for adjusting a scanning module (4) are provided. The image alignment adjustment mechanism includes a housing (10) and an adjustment device (2) arranged in the housing (10). The housing (10) has a guiding structure (13) for moving the scanning module (4). The adjustment device (2) includes a base (20), a connection portion (21) extending from the base (20), and an adjustment portion (22). An adjustment area (102) is defined on the housing (10) corresponding to the adjustment device (2), an adjustment hole (103) is defined on the housing (10) corresponding to the adjustment area (103), and the base (20) is arranged in the housing (10) adjacent to the adjustment area (102). The connection portion (21) is coupled to the guiding structure (13), and the adjustment portion (22) protrudes from the adjustment hole (103).

21 Claims, 7 Drawing Sheets

(56) References Cited

U.S. PATENT DOCUMENTS

| | | | | |
|---|---|---|---|---|
| 2010/0156328 A1* | 6/2010 | Byun | .................. | H04N 1/0473 |
| | | | | 318/3 |
| 2012/0147441 A1* | 6/2012 | Lien | .................. | H04N 1/00013 |
| | | | | 358/474 |
| 2013/0293659 A1* | 11/2013 | Suzuki | ............. | G03G 15/04072 |
| | | | | 347/118 |
| 2013/0329266 A1* | 12/2013 | Tu | ...................... | H04N 1/00013 |
| | | | | 358/497 |
| 2014/0085386 A1* | 3/2014 | Wei | ..................... | B41J 2/17596 |
| | | | | 347/85 |
| 2014/0085391 A1* | 3/2014 | Wei | ......................... | B41J 29/38 |
| | | | | 347/108 |
| 2014/0160539 A1* | 6/2014 | Wei | .................. | H04N 1/00557 |
| | | | | 358/494 |
| 2015/0029563 A1* | 1/2015 | Tao | .................. | H04N 1/00771 |
| | | | | 358/498 |

* cited by examiner

IMAGE ALIGNMENT ADJUSTMENT MECHANISM OF SCANNER AND ADJUSTMENT TOOL FOR THE SAME

BACKGROUND OF THE INVENTION

Technical Field

The present disclosure relates to a scanner and, in particular, to an image alignment adjustment mechanism and an adjustment tool for the same.

Description of Related Art

A scanning device usually uses a scanning module like a contact image sensor (CIS) or a charge coupled device (CCD) to scan an image. Normally, two guide rods are used to enable the scanning module to move straight while scanning and to avoid inclinations of the scanning module, and thereby accuracy of a scanned image can be ensured by adjusting the two guide rods.

A conventional scanning module and its guide rods are disposed inside a housing of a scanner, and they have to be arranged and adjusted in factories by manufacturers. Therefore, if it is desired to make adjustment for desired image scanning after the scanning device leaves the factory, adjustment/arrangement cannot be made without removing the housing, which causes great inconvenience in maintenance.

In views of this, in order to solve the above disadvantage, the present inventor studied related technology and provided a reasonable and effective solution in the present disclosure.

SUMMARY OF THE INVENTION

It is an object of the present disclosure to provide an image alignment adjustment mechanism of a scanner and an adjustment tool for the same, whereby an image can be adjusted from outside a scanner, and at the same time inadvertent touching events are also avoided.

Accordingly, the present disclosure provides an image alignment adjustment mechanism of a scanner, for adjusting a scanning module. The image alignment adjustment mechanism includes a housing and an adjustment device disposed inside the housing. A guiding structure for moving the scanning module is disposed inside the housing. The adjustment device includes a base, a connection portion extending from the base, and an adjustment portion. The housing includes an adjustment area corresponding to the adjustment device and includes an adjustment hole corresponding to the adjustment area, the base is disposed inside the housing adjacent to the adjustment area, the connection portion is coupled to the guiding structure, and the adjustment portion protrudes from the adjustment hole.

Accordingly, the present invention provides an adjustment tool for the image alignment adjustment mechanism of the scanner. The adjustment tool includes a handle and an engagement portion disposed on one end of the handle. The engagement portion is used to reach into the adjustment hole for engagement with the adjustment portion.

Accordingly, the present invention provides a scanner having a scanning module inside. The scanner includes a housing and an adjustment device disposed inside the housing. The housing includes a bottom portion, a side portion surrounding the bottom portion, and a top portion disposed on the side portion. A scanning area is defined on the top portion, a guiding structure is disposed inside the housing for moving the scanning module with respect to the scanning area, and the guiding structure includes a fixed guide rod and an adjustment guide rod disposed spaced apart from each other on the bottom portion. The adjustment device includes a base, a connection portion extending from the base, and an adjustment portion. The side portion includes an adjustment area corresponding to the adjustment device, the bottom portion includes an adjustment hole below the adjustment area, the base is disposed on the bottom portion adjacent to the adjustment area, the connection portion is coupled to one end of the adjustment guide rod, and the adjustment portion protrudes from the adjustment hole.

BRIEF DESCRIPTION OF THE DRAWINGS

The disclosure will become more fully understood from the detailed description, and the drawings given herein below is for illustration only, and thus does not limit the disclosure, wherein.

DETAILED DESCRIPTION OF THE INVENTION

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Figure 1:
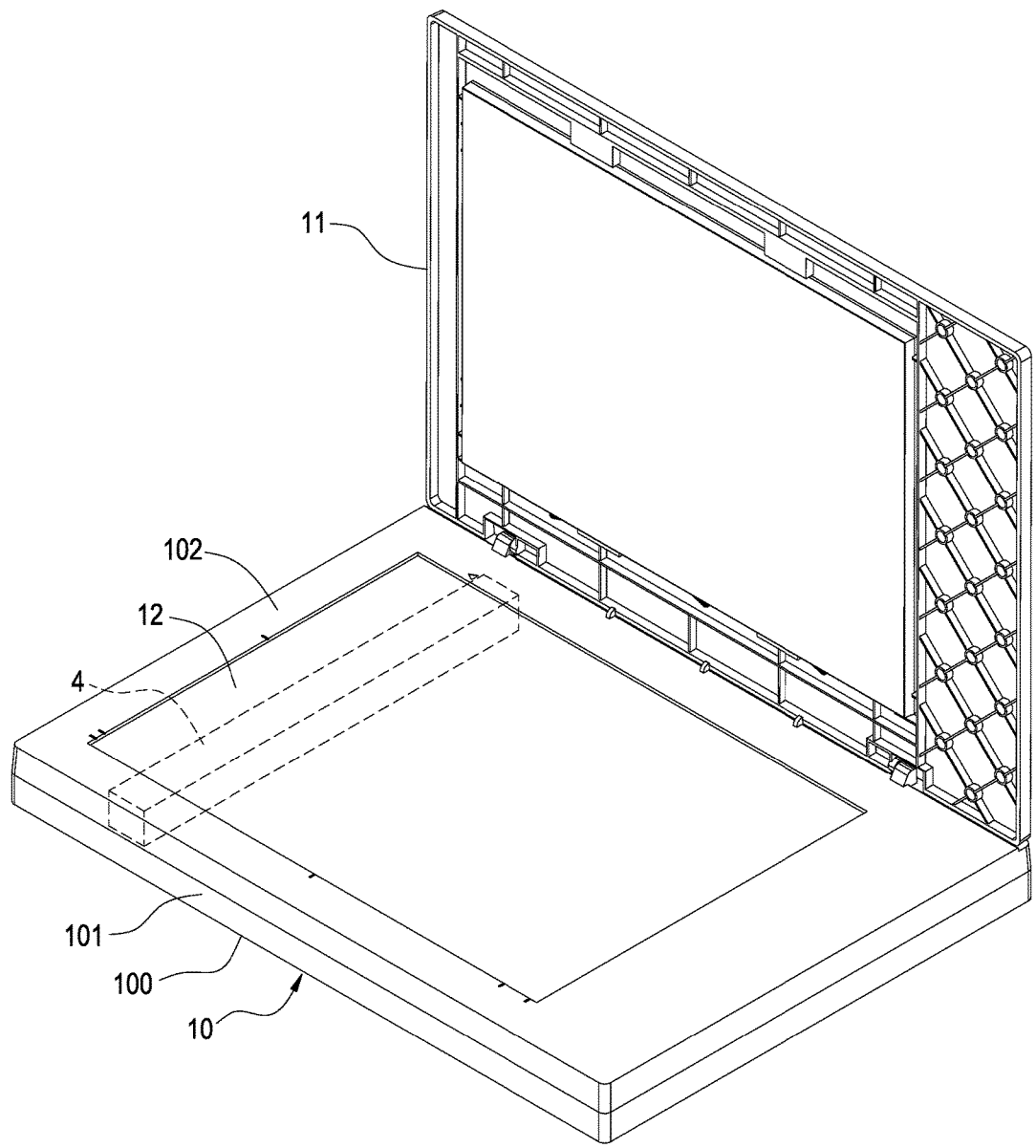
FIG. 1 is a perspective view showing a scanner according to the present disclosure.

Please refer to FIG. 1, which is a perspective view showing a scanner according to the present disclosure. The present invention provides an image alignment adjustment mechanism of a scanner and an adjustment tool for the same. The scanner 1 consists of a housing 10 and a liftable cover 11 disposed outside the housing 10 and pivotally connected to the housing at one side. A scanning module 4 such as a contact image sensor (CIS) or a charge coupled device (CCD) is disposed inside the housing 10. The housing 10 includes a bottom portion 100, a side portion 101 surrounding the bottom portion 100, and a top portion disposed on the side portion 101. A scanning area 12 is defined on the top portion. The scanning module 4 is movable on a guiding structure 13 (see FIG. 2) disposed inside the housing 10, so as to scan an area corresponding to the scanning area 12.

Figure 2:
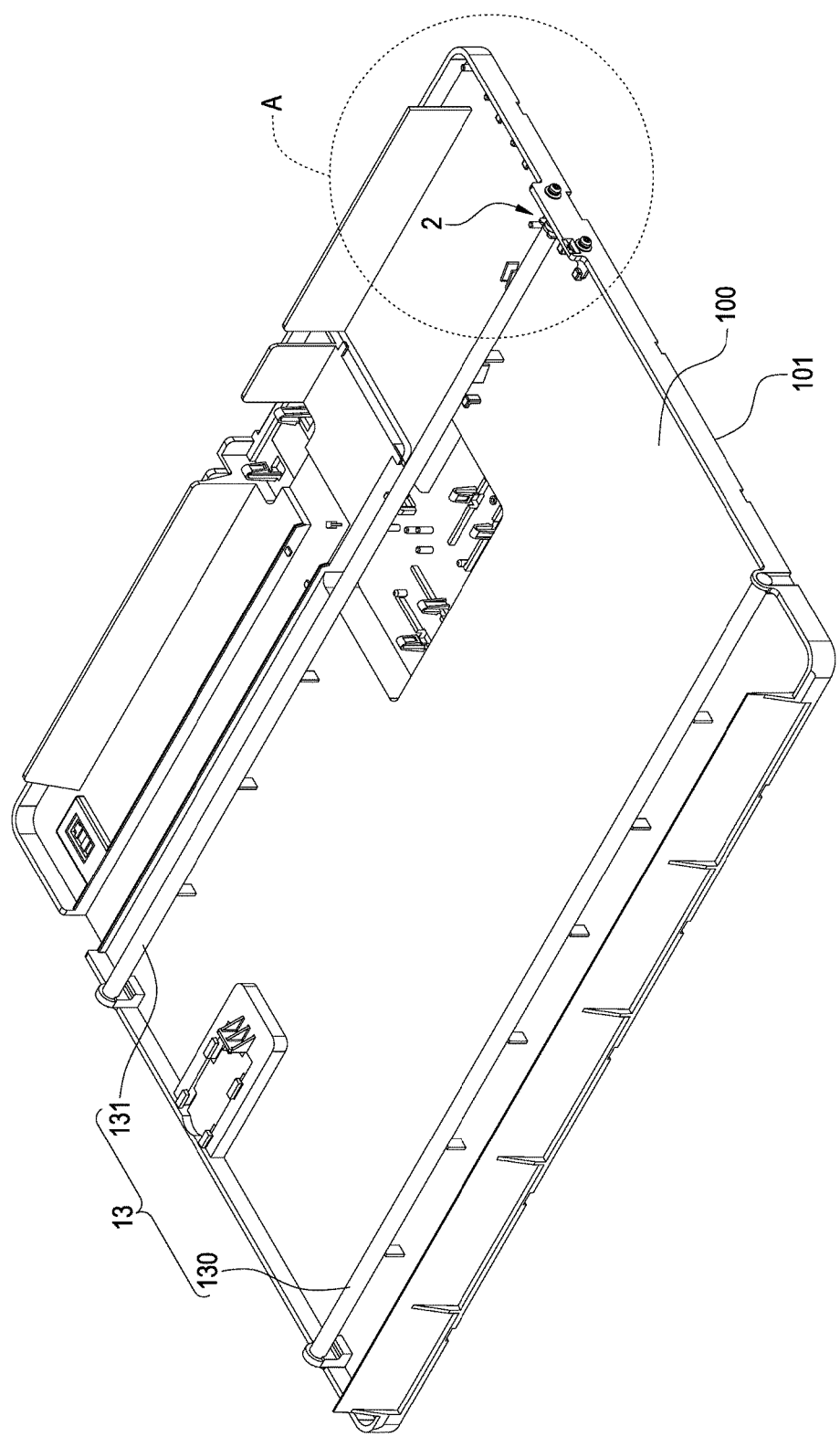
FIG. 2 is a perspective view showing an image alignment adjustment mechanism inside the scanner.
Figure 3:
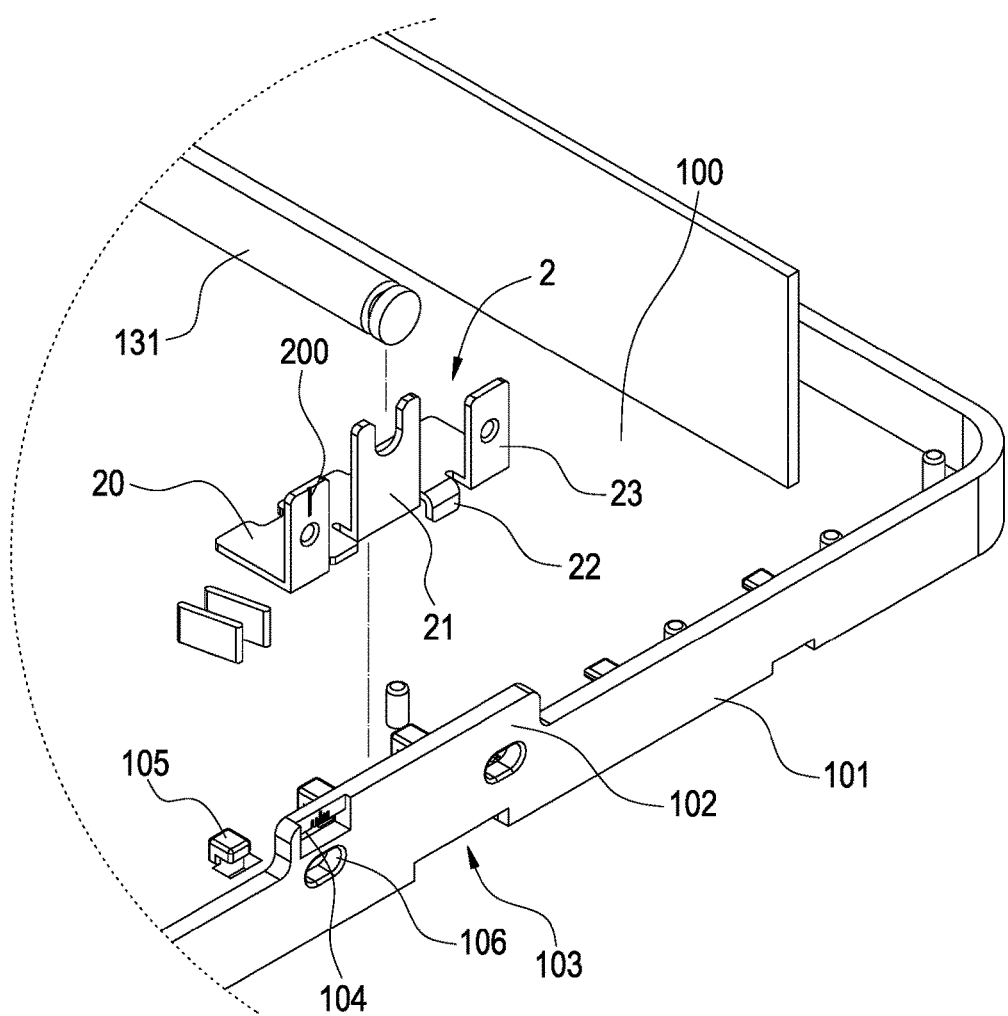
FIG. 3 is a partially enlarged view of a portion A encircled in FIG. 2.
Figure 4:
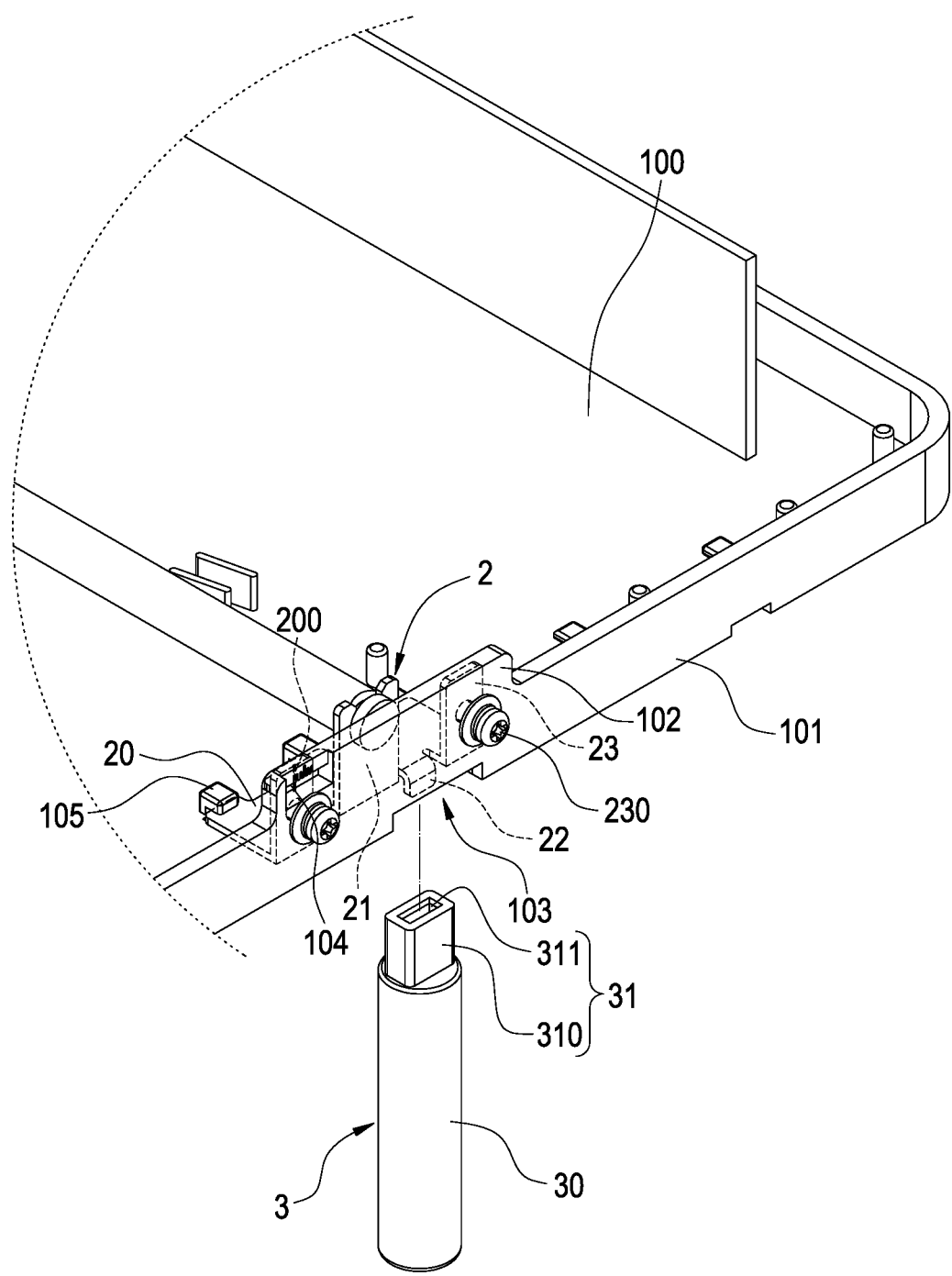
FIG. 4 is an enlarged view showing an adjustment tool to be used with reference to FIG. 3.
Figure 5:
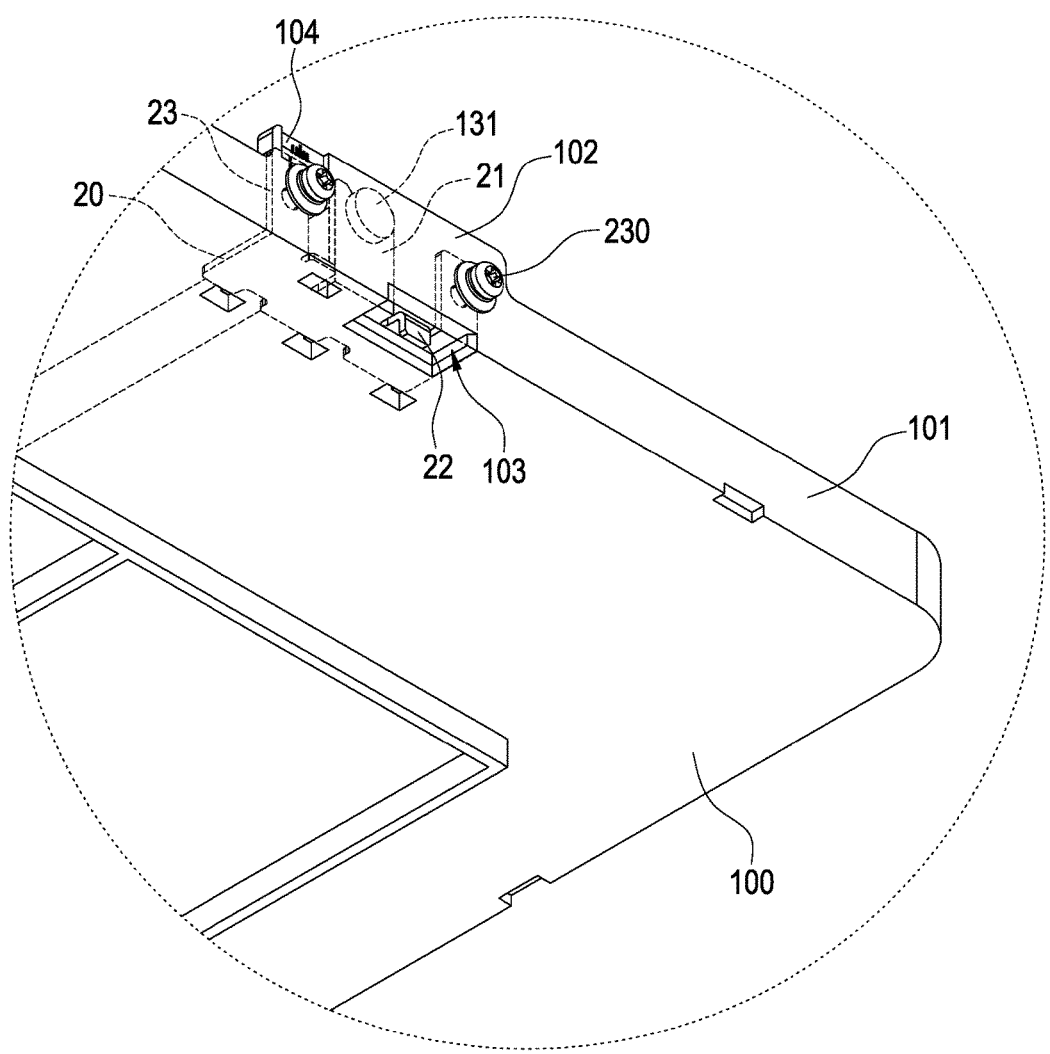
FIG. 5 is a view corresponding to FIG. 3, but viewed from another viewing angle.

Referring to FIGS. 2 and 3, the guiding structure 13 is disposed on the bottom portion 100 of the housing 10 and includes a fixed guide rod 130 and an adjustment guide rod 131 disposed parallel to each other in spaced-apart relationship. The adjustment device 2 is disposed at one end of the adjustment guide rod 131 to finely and delicately adjust one end of the adjustment guide rod 131, and thereby the scanning module 4 can move straight without inclinations while performing scanning. The adjustment device 2 includes a base 20, a connection portion 21 extending from the base 20, and an adjustment portion 22. The side portion 101 of the housing 10 includes an adjustment area 102 corresponding to the adjustment device 2, and the bottom portion 100 of the housing 10 includes an adjustment hole 103 correspondingly disposed below the adjustment area 102, the base 20 of the adjustment device 2 is disposed on the bottom portion 100 adjacent to the adjustment area 102, the connection portion 21 is coupled to one end of the adjustment guide rod 131, and the adjustment portion 22 protrudes from the adjustment hole 103, so that one end of the adjustment guide rod 131 can be finely and delicately adjusted by means of the adjustment portion 22. In the embodiment of the present disclosure, the connection portion 21 is arranged vertical on the base portion 20 and extends upward, and the adjustment portion 22 is bent downward in sheet form. As shown in FIGS. 4 and 5, it is preferably that the adjustment portion 22 protrudes in the adjustment hole 103 but does not protrudes outside the bottom portion 100, and thereby inadvertent touching of the adjustment portion 22 can be avoided by hiding the adjustment portion 22 inside the adjustment hole 103, and the adjustment portion 22 can be adjusted conveniently by using an adjustment tool 3.

Figure 6:
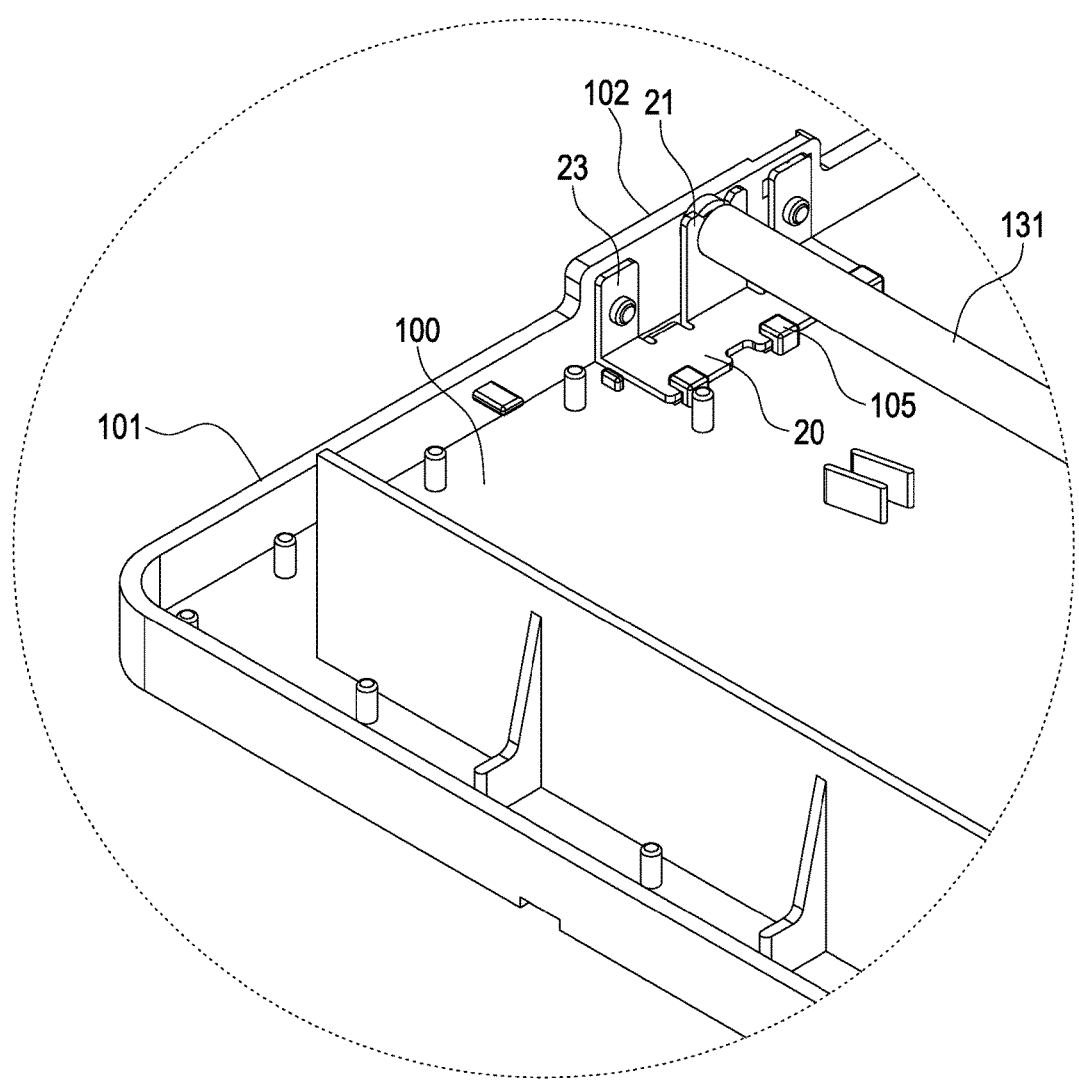
FIG. 6 is a view corresponding to FIG. 3, but viewed from still another viewing angle.

Furthermore, the adjustment area 102 further includes a dial portion 104, and a pointing mark 200 is arranged on the adjustment device 2. Therefore, the pointing mark 200 clearly indicates a distance or a range of the adjustment while an operator is adjusting the adjustment portion 22, so the operator will clearly know the adjustment range. In the present embodiment, the base 20 of the adjustment device 2 further includes at least one positioning portion 23 extending vertically upward, and the positioning portion 23 is in contact with an inner wall surface of the side portion 101 of the housing 10. A limiting portion 105 is disposed on the bottom portion 100 of the housing 10 to cause the base 20 to be in contact with the adjustment area 102 (see FIG. 6). Moreover, an enlargement hole 106 is disposed on the side portion 101 corresponding to the positioning portion 23, and a positioning element 230 is inserted through the enlargement hole 106 to fix the positioning portion 23 to the inner wall surface of the side portion 101. The positioning element 230 is, for example, a bolt.

Figure 7:
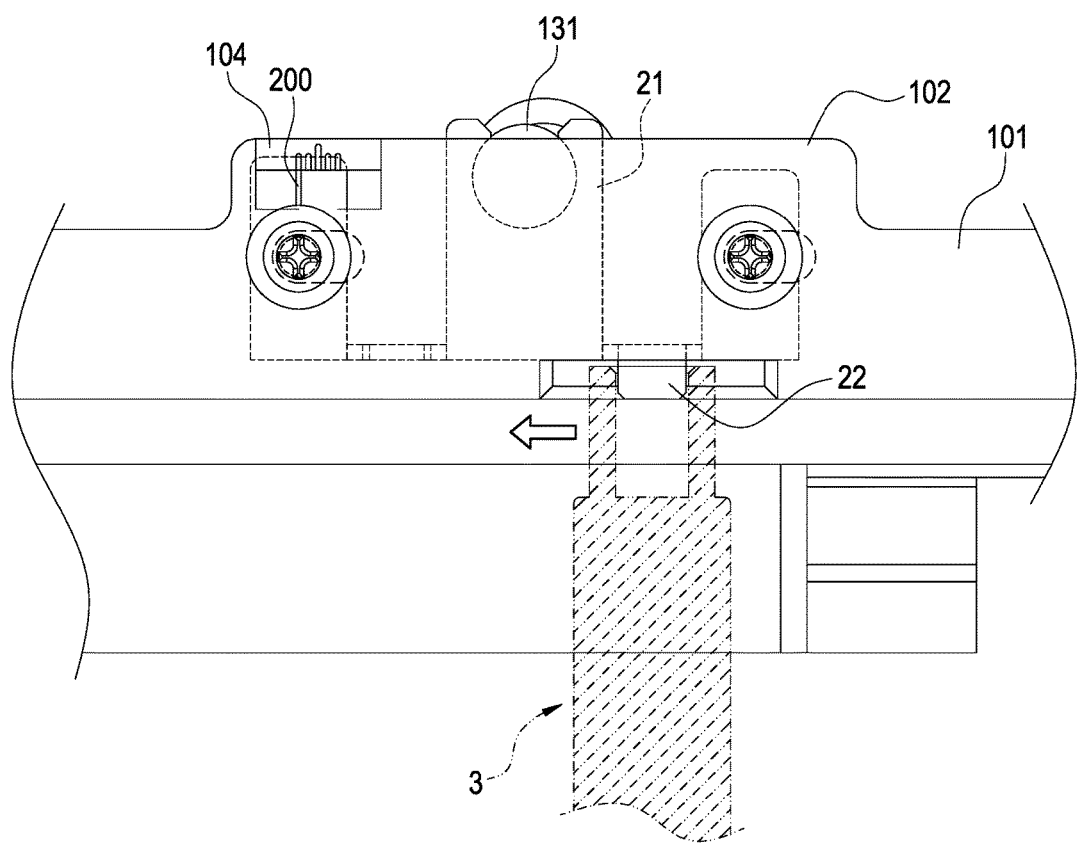
FIG. 7 is a motion view showing that the adjustment tool makes adjustment.

Referring to FIGS. 4 and 7, the adjustment tool 3 is used to adjust the adjustment portion 22. The adjustment tool 3 includes a handle 30 in a rod shape and an engagement portion 31 disposed on one end of the handle 30. The engagement portion 31 includes an engagement block 310 for reaching into the adjustment hole 103 and an engagement hole 311 recessed from an end face of the engagement block 310, and the engagement hole 311 is engaged with the adjustment portion 22. When the operator holds the handle 30 to insert the engagement portion 31 into the adjustment hole 103, the engagement block 310 is in alignment with the adjustment portion 22 to allow the adjustment portion 22 to be engaged with the engagement hole 311, so that the adjustment portion 22 can be finely and delicately adjusted by using the adjustment tool 3 to move the adjustment portion 22. The positioning element 230 can be loosened first before adjustment, and the operator can know the distance or range of the adjustment by observing the pointing mark 200 on the dial portion 104, thereby achieving fine adjustment of the adjustment guide rod 131.

Accordingly, the image alignment adjustment mechanism of the scanner and the adjustment tool for the same are constructed as described above.

In summary, the present disclosure can achieve anticipated objectives and solve the conventional defects. The present disclosure also has novelty and non-obviousness, so the present invention completely complies with the requirements of patentability. Therefore, a request to patent the present invention is filed pursuant to patent law. Examination is kindly requested, and allowance of the present application is solicited to protect the rights of the inventor.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. An image alignment adjustment mechanism of a scanner, for adjusting a scanning module (4), comprising:
    a housing (10), a guiding structure (13) for moving the scanning module (4) being disposed inside the housing (10); and
    an adjustment device (2) disposed inside the housing (10), the adjustment device (2) including a base (20), a connection portion (21) extending from the base (20), and an adjustment portion (22), wherein the housing (10) includes an adjustment area (102) corresponding to the adjustment device (2) and includes an adjustment hole (103) corresponding to the adjustment area (102), the base (20) is disposed inside the housing (10) adjacent to the adjustment area (102), the connection portion (21) is coupled to the guiding structure (13), and the adjustment portion (22) protrudes from the adjustment hole (103).

2. The image alignment adjustment mechanism of the scanner according to claim 1, wherein the housing (10) at least includes a bottom portion (100) and a side portion (101) surrounding the bottom portion (100), the adjustment area (102) is defined on the side portion (101), and the base (20) and the adjustment hole (103) are disposed on the bottom portion (100).

3. The image alignment adjustment mechanism of the scanner according to claim 2, wherein the guiding structure (13) includes a fixed guide rod (130) and an adjustment guide rod (131) disposed parallel to each other in spaced-apart relationship on the bottom portion (100), and the connection portion (21) is disposed at one end of the adjustment guide rod (131).

4. The image alignment adjustment mechanism of the scanner according to claim 2, wherein the connection portion (21) is arranged vertical on the base portion (20) and extends upward.

5. The image alignment adjustment mechanism of the scanner according to claim 4, wherein the adjustment portion (22) is bent downward in sheet form.

6. The image alignment adjustment mechanism of the scanner according to claim 1, wherein the adjustment portion (22) protrudes from the adjustment hole (103) and is hidden inside the same.

7. The image alignment adjustment mechanism of the scanner according to claim 1, wherein the adjustment area (102) further includes a dial portion (104), and a pointing mark (200) is disposed on the adjustment device (2) corresponding to the dial portion (104).

8. The image alignment adjustment mechanism of the scanner according to claim 1, wherein the base (20) further includes at least one positioning portion (23) extending vertically upward, and the positioning portion (23) is in contact with an inner wall surface of the housing (10).

9. The image alignment adjustment mechanism of the scanner according to claim 8, wherein a limiting portion (105) is disposed inside the housing (10) to cause the base (20) to be in contact with the adjustment area (102).

10. The image alignment adjustment mechanism of the scanner according to claim 8, wherein an enlargement hole (106) is disposed on the housing (10) corresponding to the positioning portion (23), and a positioning element is inserted through the enlargement hole (106) to fix the positioning portion (23) to the inner wall surface of the housing (10).

11. An adjustment tool (3) for the image alignment adjustment mechanism of claim 1, comprising:
   a handle (30); and
   an engagement portion (31) disposed on one end of the handle (30), the engagement portion (31) reaching into the adjustment hole (103) to be engaged with the adjustment portion (22).

12. The adjustment tool for the image alignment adjustment mechanism according to claim 11, wherein the engagement portion (31) includes an engagement block (310) and an engagement hole (311) recessed from an end face of the engagement block (310), and the engagement hole (311) is engaged with the adjustment portion (22).

13. A scanner, including a scanning module (4) inside, comprising:
   a housing (10), the housing (10) including a bottom portion (100), a side portion (101) surrounding the bottom portion (100), and a top portion disposed on the side portion (101), a scanning area (12) being defined on the top portion, a guiding structure (13) being disposed inside the housing (10) for moving the scanning module (4) with respect to the scanning area (12), the guiding structure (13) including a fixed guide rod (130) and an adjustment guide rod (131) disposed spaced apart from each other on the bottom portion (100); and
   an adjustment device (2) disposed inside the housing (10), the adjustment device (2) including a base (20), a connection portion (21) extending from the base (20), and an adjustment portion (22), wherein the side portion (101) includes an adjustment area (102) corresponding to the adjustment device (2), the bottom portion (100) includes an adjustment hole (103) below the adjustment area (102), the base (20) is disposed on the bottom portion (100) adjacent to the adjustment area (102), the connection portion (21) is coupled to one end of the adjustment guide rod (131), and the adjustment portion (22) protrudes from the adjustment hole (103).

14. The scanner according to claim 13, further comprising a liftable cover (11), the liftable cover (11) being disposed outside the housing (10) and pivotally connected to the housing (10) at one side.

15. The scanner according to claim 13, wherein the connection portion (21) is arranged vertical on the base portion (20) and extends upward.

16. The scanner according to claim 15, wherein the adjustment portion (22) is bent downward in sheet form.

17. The scanner according to claim 13, wherein the adjustment portion (22) protrudes from the adjustment hole (103) and is hidden inside the same.

18. The scanner according to claim 13, wherein the adjustment area (102) further includes a dial portion (104), and a pointing mark (200) is arranged on the adjustment device (2).

19. The scanner according to claim 13, wherein the base (20) further includes at least one positioning portion (23) extending vertically upward, and the positioning portion (23) is in contact with an inner wall surface of the side portion (101).

20. The scanner according to claim 19, wherein a limiting portion (105) is disposed on the bottom portion (100) to cause the base (20) to be in contact with the adjustment area (102).

21. The scanner according to claim 19, wherein an enlargement hole (106) is disposed on the side portion (101) corresponding to the positioning portion (23), and a positioning element (230) is inserted through the enlargement hole (106) to fix the positioning portion (23) to the inner wall surface of the housing (10).

* * * * *